United States Patent

Tsujimoto et al.

[15] 3,705,338
[45] Dec. 5, 1972

[54] MOTOR DRIVING SYSTEM FOR A STILL CAMERA

[72] Inventors: Kayoshi Tsujimoto, Osaka; Yoshio Kuramoto, Toyonaka; Toshio Kobori, Sakai, all of Japan

[73] Assignee: Minolta Camera Kabushiki Kaisha, Osaka, Japan

[22] Filed: Oct. 5, 1971

[21] Appl. No.: 186,640

[30] Foreign Application Priority Data

October 7, 1970 Japan..........................45/88479

[52] U.S. Cl..............................318/446, 95/31 EL
[51] Int. Cl.................................H02p 1/18
[58] Field of Search...........318/445, 446; 307/141.8; 95/31 EL

[56] References Cited

UNITED STATES PATENTS 3,598,034   8/1971   Suzuki..............................95/31 EL
3,470,803   10/1969  Fukuoka............................95/31 EL
3,064,522   11/1962  Fukuoka............................318/446 X Primary Examiner—Bernard A. Gilheany
Assistant Examiner—W. E. Duncanson, Jr.
Attorney—Craig, Antonelli & Hill

[57] ABSTRACT

In a still camera, the winding up of its film and the cocking of its shutter is controlled by an electric motor, which is linked to a film winding shaft through a planetary gear system, wherein the shafts of the planetary gears are pivoted to a cam for driving a shutter releasing member and driving a phase-motion switch. The motor is controlled by a relay which is connected to be controlled by a thyristor, the said phase-motion switch and a button-linked switch, so that the start of the motor is triggered by the thyristor, and timing is exact.

20 Claims, 7 Drawing Figures

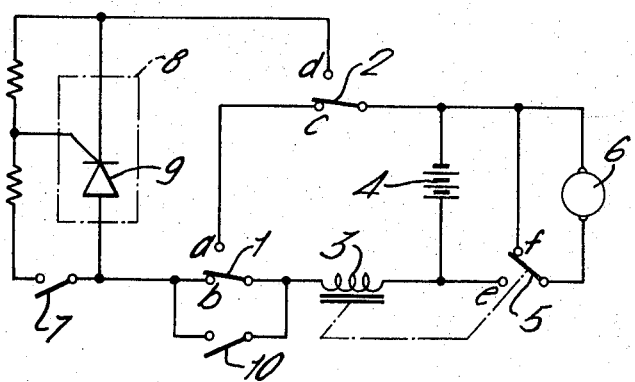

PATENTED DEC 5 1972

MOTOR DRIVING SYSTEM FOR A STILL CAMERA

BACKGROUND OF THE INVENTION

This invention relates to a motor driving system for a still camera wherein the film winding action is performed with an electric motor controlled by an electromagnetic relay which is energized after the closing of a shutter which has been opened by a releasing action.

Generally, in cameras having automatic winding mechanisms, a film-winding motor is driven after the closing of the shutter opened by the releasing action. Since on-off switching of a mechanical switch for controlling the motor is triggered mechanically in accordance with the phase of the driving mechanism, it has been difficult to adjust the shutter timing of the mechanical switch, especially in the case of non-consecutive photographing for long time exposures or in consecutive photographing.

SUMMARY OF THE INVENTION

The purpose of this invention is to eliminate the abovementioned disadvantage found hitherto in the present motor-driven still cameras. In the following, the motor-driven still camera according to the present invention will be described in detail with the help of examples.

BRIEF DESCRIPTION OF THE DRAWING

FIG. 1 is a circuit diagram of a motor-driven camera embodying the present invention, FIG. 2 is a circuit diagram showing an example of the modification in a part of FIG. 1, FIG. 3 is a perspective view showing the principal part of a film-winding mechanism of the motor-driven camera embodying the present invention.

DETAILED DESCRIPTION

Figure 4:
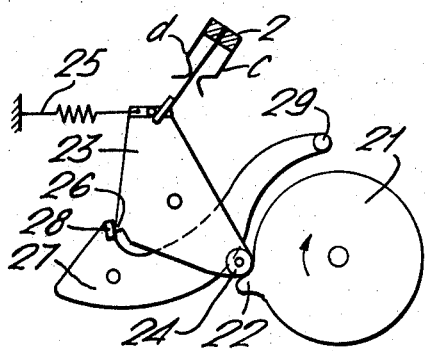
FIGS. 4 to 6 are schematic drawings which explain the principle of the action of the present invention.

In FIG. 1, a switch 1 is constituted so as to be switched to side $a$ when the camera release button is pressed, and to be switched to side $b$ when the release button is left free. A switch 2, which is switched over in accordance with the rotating phase of the driving mechanism, is constituted so as to be switched to side $c$ only at the time of completion of the film-winding, but to be switched to side $d$ for the rest of the period.

The camera is resting at first under the situation that the film-winding is completed. By pressing a button the switch 1 switches to side $a$. In the meantime, since the switch 2 is connected to the $c$ side at this resting situation as stated above, the current from battery 4 flows in coil 3 of a relay, and then moving contact 5 of the relay switches to side $e$.

Because of the above action of the electromagnetic relay, film-winding motor 6 starts to rotate to release the shutter. Upon the start of the above rotation, the switch 2 instantaneously switches to the $d$ side, and hence the current flowing in the coil 3 is cut off. Consequently, the moving contact 5 switches back to side $f$ and then the terminals of the motor 6 are short-circuited for braking, so as to limit the above-mentioned rotation of the motor to a very small angle.

By the above release action, namely, the pressing of button, the shutter is opened and a single frame of the film is exposed. After a certain time interval of the exposure, the shutter is closed and a switch 7, which is interlocked to the shutter, is closed so that a semiconductor switching element such as a thyristor 9 in a semiconductor switching circuit 8 receives a triggering signal. When the pressure applied to the button is removed, the switch 1 switches to the $b$ side, so that the semiconductor element 9 becomes conductive. As the consequence of this conduction, the current starts to flow in the coil 3 and the moving contact 5 switches to the $e$ side and the motor 6 starts to rotate, and the film-winding action is performed. After completion of a specified phase of the winding of the film, the switch 2 turns to the $c$ side, and hence the semiconductor element 9 turns off to the non-conduction state and, therefore, the motor 6 is short-circuited, so as to be braked.

By pressing the button after the closing of the switch 10, the above-mentioned performance is consecutively repeated, thereby giving consecutive photographing.

Instead of the semiconductor switching element such as thyristor 9 of the embodiment shown in FIG. 1, two transistors 11 and 12 connected as shown in FIG. 2 can also be used.

MECHANICAL CONSTITUTION

The explanation of the driving mechanism follows. In FIG. 3, counterclockwise rotation of a driving gear 13 attached to a rotating shaft of the motor 6 is transmitted to a film-winding shaft 19 through gears 14 and 15, and planetary gears 16, 16', 16'', 17 and gears 17 and 18. Shafts 20, 20', 20'' of the planetary gears 16, 16', 16'' respectively are pivoted on a timing cam 21.

Figure 5:
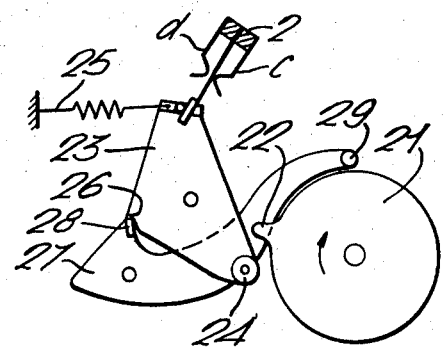

In the period of film-winding, a projection 22 of the timing cam 21 is engaged with a detent projection 24 of a detent lever 23 as shown in FIG. 4. The detent projection 24 is pressed to engage with the projection 22 of the timing cam 21 with a certain pressure provided by a spring 25. Therefore, during the period of film-winding, the projection 22 is in engagement with the detent projection 24 and therefore, the timing cam 21 stands still while the gears 17, 18, and the film-winding shaft 19 rotate clockwise. Thus film-winding is performed. When this film winding action is completed, the load on the gear 18 increased by means of a known winding-stop mechanism which is not illustrated in the FIG. and, therefore, the rotation of the gears 17, 18 and the winding shaft 19 cause the timing cam 21 to rotate clockwise with increased force. Thus, the projection 22 of the timing cam 21 pushes away the detent projection 24 overcoming the pressure provided by the spring 25 and is brought into disengagement from the detent projection 24, as illustrated in FIG. 5. At this moment, the detent lever 23 is forced to rotate clockwise, and a hook portion 26 of the detent lever 23 pushes a stopper 28 of a lever 27. The switch 2 is constituted to be driven by the lever 23, and turns to the $c$ side to deenergize the relay 3, when the detent projection 24 is pushed by the projection 22. The switch 5 is turned to the $f$ side by the above deenergization of the relay 3 and therefore the terminals of the motor 6 are short-circuited for braking.

CONSECUTIVE PHOTOGRAPHING

Figure 6:
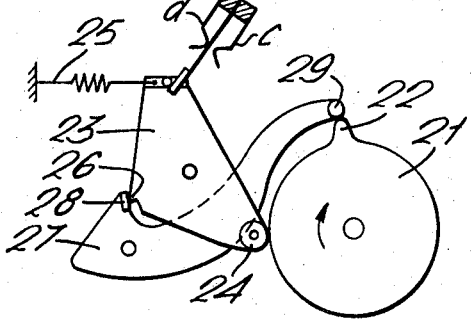

When the motor 6 is rotated further after the completion of the film-winding, the timing cam 21 rotates further and soon its projection 22 pushes a tail pin 29 of the lever 27 as shown in FIG. 6. As the consequence of the above pushing action, the hook portion 26 of the detent lever 23 is disengaged from the stopper 28 of the lever 27 and hence the detent lever 23 rotates counter-clockwise being pulled by the spring 25. Consequently, a release lever 34, of which groove 36 is engaged with a pin 35, rotates so as to push up a release shaft 30 which is then resting on an action end 34' of the lever 34 and hence the shutter ( not shown in the FIG. ) is released to open.

Next, when the timing cam 21 rotates further, its projection 22 kicks a touching rod 32 of an arcuate lever 31 and an action end 33 of the lever 31 pushes forward the action end 34 and shifts forward of the lever 34 which is pivoted on a shaft 34" in such a manner that the lever 34 can slide along the shaft 34" a little, and is pulled backwardly by a resetting spring not shown in the FIG. Consequently, the release shaft 30 is disengaged from the action end 34' and falls down.

When the film winding is completed, the detent lever 23 rotates clockwise as aforementioned. By this rotation of the detent lever 23 the groove 36 of the lever 34 is pushed rightward by a pin 35 fixed on the lever 23, and the release lever 34 rotates counterclockwise. Consequently, the action end 34' of the release lever 34 is positioned in front below the bottom end of the release shaft 30, and soon the action end 34' shifts backward to the normal position by the resetting spring not shown in the FIG. so that the action end 34' engages again with the bottom end of the release shaft 30, and the shutter is ready for the next releasing.

The switch 2 shown in FIG. 1 is linked to an action end of the detent lever 23 and its moving contact makes contact with the fixed contact c only when the film winding is completed as shown in FIGS. 4 to 6.

ANOTHER EXAMPLE

Figure 7:
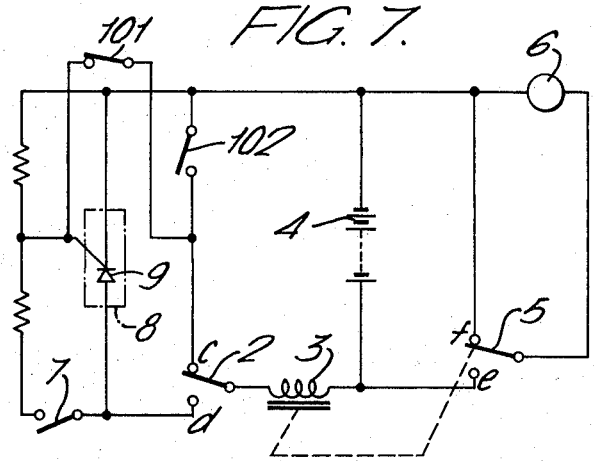
FIG. 7 is a circuit diagram of another example of the present invention.

FIG. 7 shows another embodiment of the present invention. In this FIG., a switch 102 is release button switch which is closed only while the button is pressed. A switch 101 is a switch which is in the open position for the case of consecutive photographing and is in the closed position for non-consecutive, i.e., single frame exposure.

The functions of the other composing elements indicated by the corresponding reference numerals are the same as those of the embodiment of FIG. 1. FIG. 7 shows the state in which the film winding is completed. First, the action of the non-consecutive, i.e., single frame photographing will be explained. The switch 101 is retained in the closed position. When the release button is pressed down, the switch 102 is closed and the current from the battery 4 flows in the coil 3 and hence the moving contact 5 switches to the e side. As the result of the above action, the motor 6 starts to rotate so as to perform the release action. However, at the following instant, the change-over switch 2 is switched over to the d side, and the current flowing the coil 3 is cut off, so that the moving contact 5 is switched back to the f side and the terminals of the motor 6 are short-circuited for braking action. Consequently, the rotation of the motor 6 is limited within a very small angle of rotation. By the above-mentioned release action, the shutter is opened and a single frame of the film is exposed. At the next step of the action, the shutter is closed and the switch 7 is interlocked thereto closes the triggering circuit of a semiconductor switching element 9. Therefore, when the pressure applied to the button is removed and the switch 102 is opened, the trigger voltage is applied to the triggering circuit of the semiconductor switching element 9 so that it is now triggered and becomes conductive. Accordingly, the current flows in the relay coil 3, causing the moving contact to turn to e side to start rotation of the motor 6, and the film-winding is completed. Upon completion of the film-winding, the change-over switch 2 switches to side c turning the switching element 9 off, hence short-circuiting the motor 6 for braking.

Consecutive photographing is carried out as follows.

The button is pressed and hence the switch 102 is closed under the condition that the switch 101 is open. Consequently, the motor 6 rotates only slightly; the switch 2 is switched to the d side, and then the shutter closes. In such an operation the conduction of the switching element 9 is obtainable for each time, the switch 7 is closed at each closing of the shutter and, accordingly, the above-mentioned performance is repeated consecutively while the button is pressed, and consecutive photographing is attainable.

We claim:

1. A motor driving system for a still camera comprising an electric motor for winding-up a film, for controlling a shutter releasing member and for cocking the shutter, and an electric circuit for controlling the motion of the motor, characterized in that, said electric circuit comprises
    a first switch which is switched in accordance with a specified phase in one period of said winding-up of the film and of said cocking of the shutter,
    a second switch which switches in accordance with pressing or resetting state of a button,
    a semiconductor switching element which receives a triggering signal after the moment when the previously opened shutter closes, and
    an electromagnetic relay for controlling the motion of the motor , which relay is so connected as to be controlled by said first switch, said second switch and said semiconductor switching element.

2. A motor driving system for a still camera according to claim 1, wherein said second switch is constituted so as to be closed in accordance with the pressing of the button.

3. A motor driving system according to claim 1, wherein a shaft of the motor is linked to a film winding shaft through at least a planetary gear system, wherein shafts of the planetary gears are pivoted to a cam for driving said shutter releasing member and said first switch.

4. A motor driving system according to claim 2, wherein a shaft of the motor is linked to a film winding shaft through at least a planetary gear system, wherein shafts of the planetary gears are pivoted to a cam for driving said shutter releasing member and said first switch.

5. A motor driving system for a still camera having a camera actuating switch, a shutter, a release member for the shutter, a shutter cocking mechanism and means for transporting film upon which an image is to be recorded, comprising:

an electric motor for winding said film;

first means coupling said electric motor to said shutter cocking mechanism and said release member whereby said motor will control the operation thereof; and an electric circuit for controlling the operation of said motor, said electric circuit including:

a source of electric power;

a first switch controllably coupled between said source of power and said motor, for connecting said power source to said motor to drive said motor in a first position of said first switch and for short-circuiting said motor so as to provide braking therefor, in a second position of said first switch, said first switch having an electromagnetic relay coil and a movable contact arm electromagnetically coupled thereto, said arm being switchable between said first and second positions;

a second switch, responsive to a specified degree of operation of said motor, coupled between said source of electric power and said relay;

a third switch, responsive to the operation of said camera actuating switch for connecting said relay coil to said power source through said second switch; and a semiconductor switching element coupled between said power source and said relay coil through at least one of said second and third switches, responsive to the closing of said shutter, for connecting said power source to said relay coil through at least one of said second and third switches, so as to drive said motor to wind said film upon the completion of an exposure.

6. A motor driving system for a still camera according to claim 5, wherein said first means includes means responsive to the energization of said motor upon the operation of said camera actuating switch, for operating said shutter release member to release said shutter and for operating said second switch to deenergize said relay coil.

7. A motor driving system for a still camera according to claim 6, further including a fourth switch, responsive to the elapse of the exposure time from the opening of said shutter for triggering said semiconductor switching element, whereby said relay coil will be energized, thereby to close said first switch to said first position to drive said motor.

8. A motor driving system for a still camera according to claim 5 wherein said electric motor includes a rotational shaft upon which is mounted a first driving gear, and said camera further includes a film winding shaft upon which said film is wound, and a planetary gear system mechanically coupling said rotatable shaft to said film winding shaft, and further including a cam-switch arrangement coupled to said planetary gear system for operating said shutter release member and said second switch.

9. A motor driving system for a still camera according to claim 8, wherein said cam-switch arrangement includes a timing cam mechanically coupled to said planetary gear system through a plurality of gear shafts linked to the gears of said planetary gear system, and wherein said timing cam is a projection thereon engageable with a detent projection of a detent lever mechanically coupled to said second switch, said detent lever being rotatably mounted about a detent lever axis and further including a spring member for biasing said detent lever so that the detent projection thereon will engage the projection of said timing cam in a first position thereof during the winding of said film.

10. A motor driving system for a still camera according to claim 9, wherein said detent lever further includes a hook portion mechanically engageable with a stop member of an additional lever, said additional lever being rotatably mounted about an axis parallel to said detent lever axis, and wherein said additional lever further includes a tail pin engageable with said projection of timing cam to disengage said hook portion of said detent lever from said stop member of said additional lever upon a predetermined rotation of said timing cam.

11. A motor driving system for a still camera according to claim 10, wherein said shutter release member further includes a release lever rotatably mounted about an axis parallel to the axis of said detent lever, engageable through a groove therein with a pin affixed to said detent lever, and a release shaft engageable with one end of said release lever to control the operation of said shutter upon the movement of said release lever.

12. A motor driving system for a still camera according to claim 11, further including an arcuate lever, rotatably mounted about an axis parallel to said detent lever axis, having a rod at one end thereof engageable with said projection of said timing cam upon an extended rotation of said cam, and wherein said release lever includes a pin extending transverse to the surface thereof for engaging the other end of said arcuate lever upon the engagement of said rod at said one end of said lever with said projection of said timing cam.

13. A motor driving system for a still camera according to claim 5, wherein said second and third switches are connected in series between said power source and said relay coil.

14. A motor driving system for a still camera according to claim 13, wherein said semiconductor switching element comprises a thyristor having the anode and cathode thereof respectively connected to said second switch and one end of said power source.

15. A motor driving system for a still camera according to claim 13, wherein said semiconductor switching element comprises a thyristor having the anode and cathode thereof respectively connected to said third and second switches.

16. A motor driving system for a still camera according to claim 14, wherein said first means includes means, responsive to the energization of said motor upon the operation of said camera actuating switch, for operating said shutter release member to release said shutter and for operating said second switch to deenergize said relay coil, and further including a fourth switch, responsive to the elapse of exposure time from the opening of said shutter, for triggering said thyristor, whereby said relay coil will be energized to close said first switch to said first position to drive said motor.

17. A motor driving system for a still camera according to claim 16, further including a fifth switch, connected between the control electrode of said thyristor and the connection point of said second and third switches for effecting consecutive operation of said camera.

18. A motor driving system for a still camera according to claim 15, further including a fifth switch, connected between said relay coil and the anode of said thyristor for effecting consecutive operation of said camera.

19. A motor driving system for a still camera according to claim 13, wherein said semiconductor switching element comprises a pair of transistors, the bases and collectors of which are respectively cross connected with each other while the emitters of each of said transistors are respectively connected to said second switch and to one end of said power source.

20. A motor driving system for a still camera according to claim 13, wherein said semiconductor switching element comprises a pair of transistors, the bases and collectors of which are respectively cross connected to each other, while the emitters of which are connected to said second and third switches, respectively.

* * * * *